(12) United States Patent
Gross

(10) Patent No.: US 11,167,853 B2
(45) Date of Patent: Nov. 9, 2021

(54) PASSENGER SEAT SYSTEM FOR A MEANS OF TRANSPORT

(71) Applicant: Airbus Operations GmbH, Hamburg (DE)

(72) Inventor: Claus-Peter Gross, Hamburg (DE)

(73) Assignee: Airbus Operations GmbH

( * ) Notice: Subject to any disclaimer, the term of this patent is extended or adjusted under 35 U.S.C. 154(b) by 448 days.

(21) Appl. No.: 16/126,076

(22) Filed: Sep. 10, 2018

(65) Prior Publication Data
US 2019/0092479 A1 Mar. 28, 2019

(30) Foreign Application Priority Data

Sep. 27, 2017 (DE) ...................... 10 2017 122 387.8

(51) Int. Cl.
| | |
|---|---|
| *B64D 11/06* | (2006.01) |
| *B60N 2/005* | (2006.01) |
| *B60N 2/30* | (2006.01) |
| *F16B 2/14* | (2006.01) |
| *F16B 2/18* | (2006.01) |

(52) U.S. Cl.
CPC .......... *B64D 11/0696* (2013.01); *B60N 2/005* (2013.01); *B60N 2/3097* (2013.01); *F16B 2/14* (2013.01); *F16B 2/185* (2013.01)

(58) Field of Classification Search
CPC .................. B60N 2/01575; B64D 11/0696
See application file for complete search history.

(56) References Cited

U.S. PATENT DOCUMENTS

| | | | | |
|---|---|---|---|---|
| 347,894 | A * | 8/1886 | Simmons ........... | B60N 2/01583 248/503.1 |
| 584,657 | A * | 6/1897 | Worley .............. | B60N 2/01583 248/503.1 |
| 2,655,981 | A * | 10/1953 | Nichols ................... | B61C 17/04 297/323 |
| 3,622,202 | A * | 11/1971 | Brown ..................... | A47C 1/02 297/344.1 |

(Continued)

FOREIGN PATENT DOCUMENTS

| | | |
|---|---|---|
| DE | 198 51 392 A1 | 5/1999 |
| DE | 20 2004 015 211 U1 | 12/2004 |

(Continued)

*Primary Examiner* — Christopher D Hutchens
(74) *Attorney, Agent, or Firm* — Lerner, David, Littenberg, Krumholz & Mentlik, LLP

(57) ABSTRACT

A passenger seat system) for a transport means has an elongate carrier structure, to be attached, fixedly with respect to a structure, mutually spaced-apart raster openings on the carrier structure top side, and a seat having a seat frame. The seat frame is displaceable and arrestable on the carrier structure, has a bottom side lying on the carrier structure, a top side holding a seat surface, an arresting device on the bottom side and an operating unit coupled to the arresting device, and movable into an arresting position and an unlocking position. The arresting device has an arresting body, mounted so as to be movable perpendicularly with respect to the carrier structure and pushed by a spring device, by a spring force, into an arresting position, and a locking unit for automatically holding the arresting body in the arresting position when the arresting body reaches the arresting position.

9 Claims, 3 Drawing Sheets

(56) References Cited

U.S. PATENT DOCUMENTS

| | | | | |
|---|---|---|---|---|
| 4,501,404 | A | * | 2/1985 | Nelson ............... B64D 11/0696 248/503.1 |
| 4,588,226 | A | * | 5/1986 | Young ..................... A47C 3/18 297/344.24 |
| 5,169,091 | A | | 12/1992 | Beroth |
| 5,489,172 | A | * | 2/1996 | Michler .................... B64C 1/20 244/118.1 |
| 5,871,318 | A | | 2/1999 | Dixon et al. |
| 9,284,056 | B2 | | 3/2016 | Mejuhas |
| 9,663,232 | B1 | | 5/2017 | Porter et al. |
| 2006/0032979 | A1 | * | 2/2006 | Mitchell .......... B64D 11/00155 244/118.6 |
| 2007/0232101 | A1 | * | 10/2007 | Hudson .............. B64D 11/0696 439/157 |
| 2007/0253762 | A1 | * | 11/2007 | Hudson .............. B64D 11/0696 403/83 |
| 2008/0191115 | A1 | | 8/2008 | Stubbe |
| 2009/0026827 | A1 | | 1/2009 | Bishop |
| 2010/0001545 | A1 | * | 1/2010 | De Rico Herrero ..... B60N 2/24 296/65.03 |
| 2010/0096502 | A1 | * | 4/2010 | VanderWolk ...... B64D 11/0696 244/122 R |
| 2011/0198464 | A1 | * | 8/2011 | Hoge ................... B60N 2/0715 248/223.41 |
| 2011/0253874 | A1 | * | 10/2011 | Marechal ........... B64D 11/0696 248/503.1 |
| 2012/0235011 | A1 | * | 9/2012 | Roy ................... B64D 11/0696 248/503.1 |
| 2016/0194085 | A1 | | 7/2016 | Stubbe |
| 2017/0129613 | A1 | * | 5/2017 | Cailleteau .............. A47B 91/08 |
| 2018/0194476 | A1 | | 7/2018 | Gross |

FOREIGN PATENT DOCUMENTS

| | | |
|---|---|---|
| DE | 10 2011 100 107 A1 | 5/2012 |
| DE | 10 2013 108 540 A1 | 2/2015 |
| DE | 10 2015 116 414 A1 | 3/2017 |

* cited by examiner

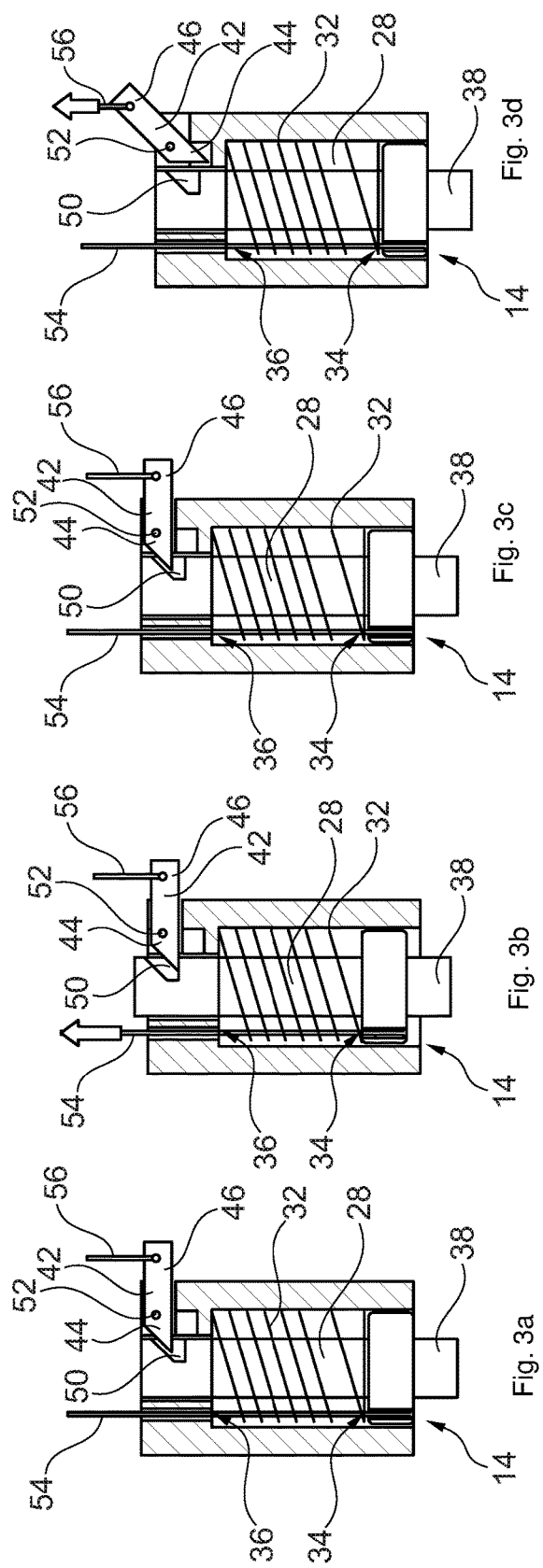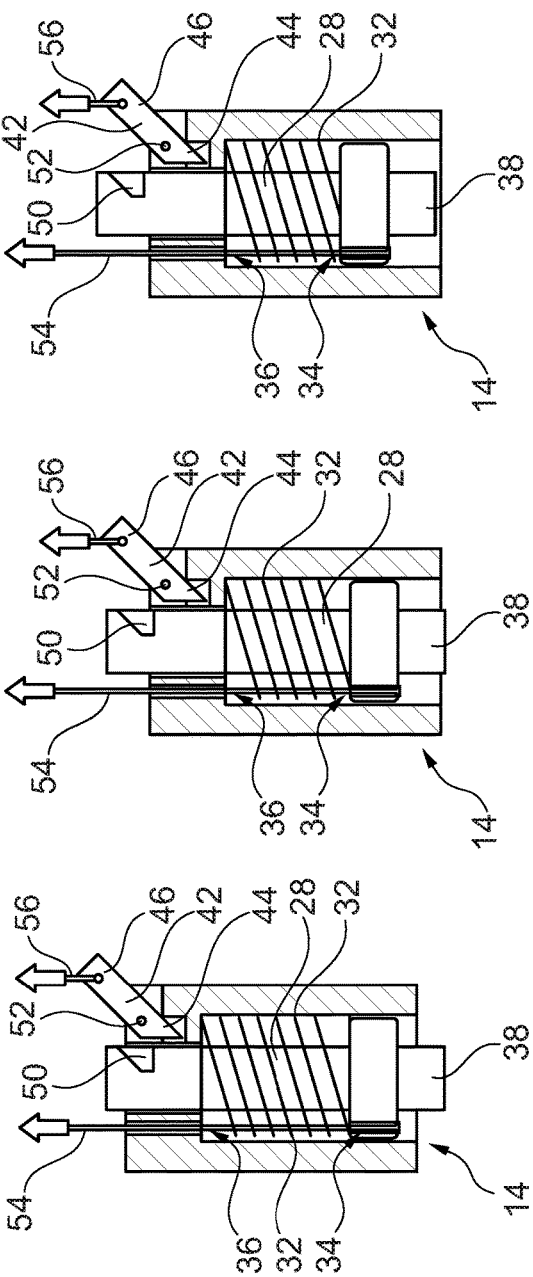

PASSENGER SEAT SYSTEM FOR A MEANS OF TRANSPORT

FIELD OF THE INVENTION

The invention relates to a passenger seat system for a means of transport, and to a means of transport, in particular an aircraft, having a passenger cabin and having a passenger seat system installed therein.

BACKGROUND OF THE INVENTION

The passenger cabin of a means of transport, for example of a passenger aircraft, commonly has a construction determined by the operator of the means of transport. The construction may relate in particular to a class division, which is associated with individual seat spacings and a particular number and arrangement of other devices. To realize individual seat spacings, a carrier structure is commonly provided on a cabin floor, which carrier structure permits a rastered fastening of passenger seats and other fixtures. A carrier structure of said type may for example comprise a seat rail arranged on a floor of the cabin, which seat rail is equipped with openings through which a longitudinal slot extends. Fastening means may be arranged at these openings, which fastening means are connected to the passenger seats or other devices.

It is moreover known for fastening means for passenger seats and other fixtures to be provided which permit quick actuation without the use of tools. An operator of the means of transport is thus provided with the facility to quickly change the construction of the cabin in accordance with demand, and adapt seat spacings or class divisions for example in accordance with the mission.

Concepts for realizing a quickly releasable fastening of said type exist. For example, DE 10 2015 116 414 A1 presents a passenger seat system having an arresting device which is arranged on a seat frame and which has a resiliently mounted arresting body which is movable from a locking position into a release position by means of a Bowden cable. In the locking position, the arresting body snaps into a corresponding opening, whereas, in the release position, the arresting device is released from the carrier structure.

BRIEF SUMMARY OF THE INVENTION

The use of a resiliently mounted arresting body, and the introduction or snapping thereof into an opening of a carrier structure by means of spring force, is mechanically very simple. However, the service life of a spring suitable for this purpose, which holds the arresting body securely in the opening, may sometimes be too short for an intended service life of the means of transport. If a spring were to exhibit a mechanical defect, this can have the effect that the respective seat, or the respective seat row, is temporarily rendered unusable.

An aspect of the invention relates to a passenger seat system which permits a quick reconfiguration of a cabin and, at the same time, furthermore exhibits a longer service life.

A passenger seat system for a means of transport is proposed, having at least one elongate carrier structure which can be attached, fixedly with respect to a structure, in the interior of the means of transport and which has a multiplicity of mutually spaced-apart raster openings on a top side of the carrier structure, and at least one seat which has a seat frame, which seat frame is displaceable and arrestable on the carrier structure and has a bottom side, which lies on the carrier structure, and a top side, which holds a seat surface. The seat frame has an arresting device on the bottom side and has an operating unit, which is coupled to the arresting device, at a position averted from the bottom side. The operating unit is movable at least into an arresting position and an unlocking position. The arresting device has an arresting body which is mounted so as to be movable perpendicularly with respect to the carrier structure and which is pushed by a spring device, by means of a spring force, into an arresting position and which, in a release position situated opposite the arresting position, projects with an actuation end out of the arresting device. The arresting device furthermore has a locking unit which is designed to automatically hold the arresting body in the arresting position as soon as the arresting body reaches the arresting position.

The carrier structure is to be understood as a base for the fastening of passenger seats and other devices in the cabin of the means of transport. Said carrier structure is a component or an arrangement of components which, by means of the fastening thereof, is fixed with respect to a structure in the interior of the means of transport. The carrier structure may in particular have two floor rails arranged parallel to one another, which are also known as seat rails, and which have a fastening raster. Alternatively or in addition to this, the carrier structure may also have slide rails or slide rail attachments for fastening to a floor rail in order to permit the sliding movement of passenger seats and other devices.

The carrier structure may have a raster in the form of depressions or openings which are arranged with predefined spacings on the carrier structure. Said depressions or openings permit the insertion of the arresting body in order, when the arresting body is in engagement, to prevent movement of the arresting device on the carrier structure. The carrier structure, the depressions or openings and the arresting bodies must, in particular in an aircraft, be designed to pass approval-relevant 16 G load tests. The carrier structure is therefore normally connected fixedly to the structure of the means of transport, and thus permits the adequate introduction of load into the structure.

As mentioned above, the carrier structure may be suitably equipped with guide devices in order to permit easier displacement of a passenger seat or of another device. Said guide devices could be integrated directly into the carrier structure, or, for example in the case of a retrofit solution for existing carrier structures, such as for example floor rails, arranged on these. The function of the guide could be realized for example by means of a preferably centrally arranged slot of a conventional floor rail as carrier structure. Such floor rails are known for example as Douglas rails. A guide device could likewise be realized by means of an additionally or alternatively provided separate sliding guide with two profile cross sections which are coordinated with one another and which engage into one another and which are displaceable along one another.

The seat frame of the at least one seat may correspond to a conventional seat frame for the respective means of transport. In particular, the seat frame may have multiple mutually spaced-apart frame legs, which stand on the carrier structure and which hold bearing elements for bearing seat cushions. In passenger aircraft, for example, a type of construction of a seat frame which has four legs composed of a metallic material, the profile cross section of which has projections for stiffening purposes, has become established. The frame legs may, in cross-sectional regions subjected to relatively low load, be equipped with openings or recesses for the purposes of reducing weight. The bearing elements held by the frame legs could for example comprise one or two horizontally arranged tubes. In the configuration of the seat frame, provision could also be made for multiple seats to be arranged on one single seat frame. It would consequently be possible for the bearing elements to also extend in a lateral direction considerably beyond the seat frame.

In the consideration below, an upper side, which holds a seat surface, of the seat frame is referred to as "top side", whereas a lower side, which is connected to the carrier structure, is referred to as "bottom side". The height of the seat frame and thus the approximate vertical position of the top side of the seat frame are determined by a corresponding seat height for a passenger seat.

The arresting device is to be understood as an apparatus which permits selective arresting of the seat frame to the carrier structure, which apparatus should be releasable as quickly as possible and as far as possible without great expenditure of force, but should be very reliably capable of being arrested again and subjected to the full load on which the design of the seat frame is based.

The operating unit is a device averted from the carrier structure. Said operating unit is preferably arranged on a top side of the seat frame, and therefore so as to face towards a user. It should be possible for the arresting device to be reliably at least released by means of the operating unit, wherein this should be performed without the use of tools. The operating unit may have in particular a handle, a lever, a button or some other actuating element that can be moved between predefined positions by a user.

A special feature of the passenger seat system lies in the fact that the arresting body projects with one actuation end out of the arresting device. The arresting body preferably projects out of the arresting device only when the arresting device is situated in a release position. The actuation end which then projects out of the arresting device is clearly visible to a user and can provide visual feedback with regard to the fact that the arresting device is not in an arresting position. If an arresting action by means of the spring force should fail for any particular reason, a user can consequently manually exert a pressure on the actuation end. By means of the locking unit, automatic locking is then realized, which reliably holds the arresting body firmly in the arresting position. Since the arresting body is consequently locked in a manner dependent on its position, it is possible for reliable locking of the arresting body to occur even in the presence of a defective spring device, and the locking of the arresting body is independent of the function of the spring.

Altogether, by means of the passenger seat system according to an embodiment of the invention, a reliable and quick arresting action without the use of tools, and a quick release, of a passenger seat in a means of transport is made possible. The above-stated features make it possible to realize a longer service life, and the successful arresting of an arresting body is not dependent on the force action of a spring.

In one advantageous embodiment, the operating unit is connected to a first traction mechanism which is coupled to the arresting body and which is designed to apply a pulling force, which acts oppositely to the spring force, to the arresting body. The traction mechanism may be designed as a linear movement element and may take different forms. To simplify the mounting, guidance and change in direction between the movement of the operating unit and of the arresting body, use is expediently made in particular of Bowden cables, or alternatively also wire or chain pulls. The spring force acting on the arresting body is directed to the carrier structure, that is to say in a direction away from the top side of the seat frame. However, the pulling force is directed to the top side of the seat frame and, in terms of magnitude, exceeds the spring force in order to move the arresting body upwards, that is to say in a direction towards the top side, away from the carrier structure. The arresting action on the carrier structure can thus be released.

Owing to the automatic locking unit, the operating unit preferably has at least one movement means which is coupled to the locking unit and which is designed to selectively release the locking unit. The type and embodiment of the locking unit is, at this juncture, entirely arbitrary, and may be realized in any desired manner. Owing to the coupling with the aid of a movement means, it is for example possible for a component of the locking unit to be released from an engaged position. To realize the locking unit, use is expediently made in particular of resiliently mounted snap-action or detent means which are designed to engage into a form feature of the arresting body or of a component arranged thereon. The movement means can selectively release the engagement of the snap-action or detent means.

The locking unit preferably has a tiltably mounted lever with a first end and with a second end, wherein the first end is designed to engage into a depression on a shell surface of the arresting body, and wherein the second end is designed to be coupled to the operating unit. The arresting body may be guided in a recess, for example a bore, in the desired manner. The lever may be arranged at the edge of the arresting body. For example, it may be mounted at the edge of the bore. Altogether, the lever may be realized in the manner of a tilting lever. Here, the first end projects to the arresting body, the depression of which is arranged on a side facing towards the lever. The depression extends preferably only over a discrete region of the shell surface, such that the lever can engage into the depression only in an arresting position. If the depression of the arresting body and the first end of the lever are in alignment, said lever can be pushed in by spring loading, or by means of areal guidance, into the depression.

It is expedient if the arresting device has a tilting limiting means which is designed to allow the first end of the lever, in an arresting position of the arresting body, when the first end is engaging in the depression, to tilt only in a direction away from the top side of the seat frame. Accordingly, if the first end of the lever is in the depression of the arresting body, the first end of the lever can move only in a direction away from the top side of the seat frame. A movement in the other direction is prevented by the tilting limiting means. This has the effect that the arresting body likewise cannot be moved in the direction of the top side of the seat frame, and is consequently blocked in its arresting position. Only when the lever is released from its engagement with the depression is it possible for the arresting body to be moved into a release position again. The tilting limiting means may be realized by a stop which comes into areal contact with the lever and which is arranged above the lever, that is to say on a side of the lever directed towards the top side of the seat frame. The stop may be realized in the form of a shoulder, a pin or some other form feature which can be brought into areal contact with the lever in the desired manner.

Preferably, the first end of the lever is, on one side, bevelled in ramp-shaped fashion, wherein the bevelled surface faces towards the top side of the seat frame. The depression is formed in the arresting body correspondingly with respect to the first end. By means of the ramp-shaped bevel, a reliable protrusion of the first end into the depression, and reliable areal contact with the arresting body, can be established.

It is particularly preferable for the movement means to be designed as a second traction mechanism, which extends from the operating unit to the second end of the lever. Like the first traction mechanism, the second traction mechanism may be designed as a linear movement element, and may take different forms. To simplify the mounting, guidance and change in direction between the movement of the operating unit and of the arresting body, use could be made in particular of Bowden cables, or alternatively also wire or chain pulls. It is expedient for the first and the second traction mechanism to be operable independently of one another. Pulling the second traction mechanism causes the second end of the lever to be pulled in the direction of the top side of the seat frame. Thus, the first end is pushed in the opposite direction. With corresponding dimensioning of the lever, this has the effect that the first end slides out of the depression and releases the arresting body. A release of the arresting body can consequently be realized by pulling the first traction mechanism.

The invention furthermore relates to a means of transport having a cabin and having at least one passenger seat system with the above-described features formed therein.

The means of transport may be an aircraft. The means of transport may furthermore have service units above passenger seats, wherein the number of service units corresponds at least to the maximum possible number of passenger seats situated therebelow. A service unit could be understood to mean a device which has various displays, for example for a seatbelt fastening command or a non-smoking signal, a loudspeaker for announcements, an air nozzle, a container for oxygen masks and the like, and which correlates in each case with passenger seats situated therebelow. It is particularly advantageous if the number of service units corresponds at least to a maximum possible number of passenger seats situated therebelow in the respective region, such that, in the event of displacement of the passenger seats or in the event of a change of the seat spacings, a displacement of the service units is not necessary. It is furthermore conceivable to provide a number of service units which even exceeds the maximum possible number of passenger seats. Coverage of each passenger seat can consequently be ensured regardless of the spacings formed in between them. Depending on the respective region in the cabin that is to be equipped with the passenger seat system, it is possible to realize a certain overdeterminacy by virtue of the number of service units slightly exceeding the maximum number of passenger seats, wherein an excess of 5 to 10% would be conceivable, though this may also be greater or smaller.

BRIEF DESCRIPTION OF THE DRAWINGS

Further features, advantages and possible uses of the present invention will emerge from the following description of the exemplary embodiments and from the figures. Here, all of the features described and/or illustrated in the figures form the subject matter of the invention individually and in any desired combination, even independently of the combination of said features in the individual claims or the back-references thereof. Furthermore, in the figures, the same reference designations are used for identical or similar objects.

FIGS. 3a-3g show the process of the arresting and release of the arresting device.

DETAILED DESCRIPTION

Figure 1:
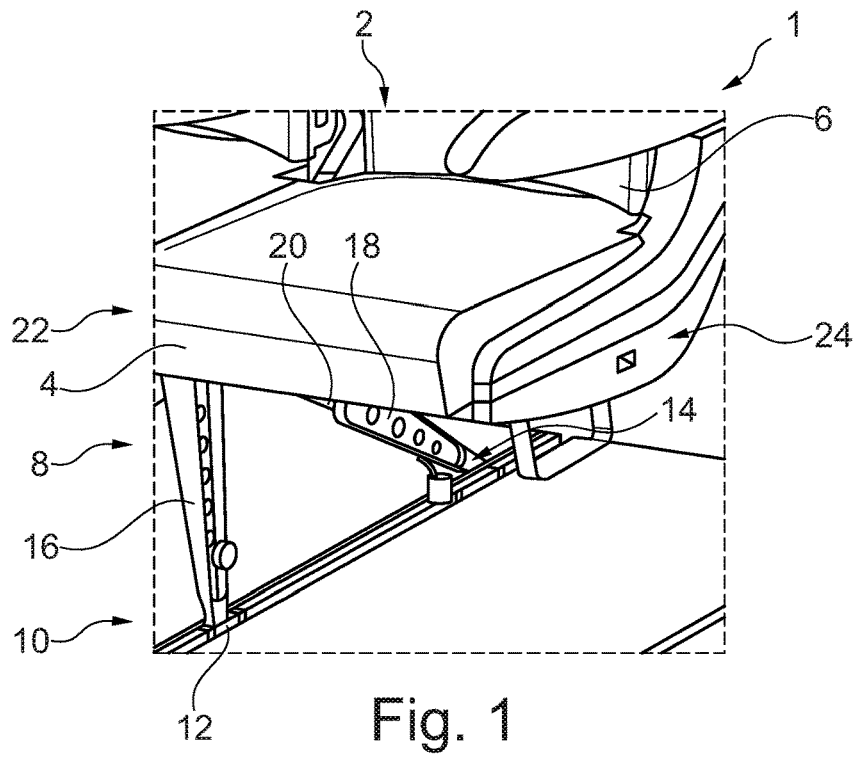
FIG. 1 shows a passenger seat system in a three-dimensional illustration.

FIG. 1 shows a passenger seat 2 with a seat surface 4, with a backrest 6, and with a seat frame 8, which seat frame lies with a bottom side 10 on a carrier structure 12 and is connected to the latter by means of an arresting device 14. The details will be presented in various illustrations in the further following figures. It is to be noted here that the carrier structure 12 is, in several illustrations, equipped with a removable or displaceably arranged cover.

The seat frame 8 has front seat legs 16, rear seat legs 18 and bearing tubes (not visible) held by the seat legs 16, 18. A diagonal strut 20 connects the front seat legs 16 to the rear seat legs 18 and increases the stiffness of the seat frame 8. On a top side 22 of the seat frame 8, a part of an operating unit 24 is indicated.

Figure 2A:
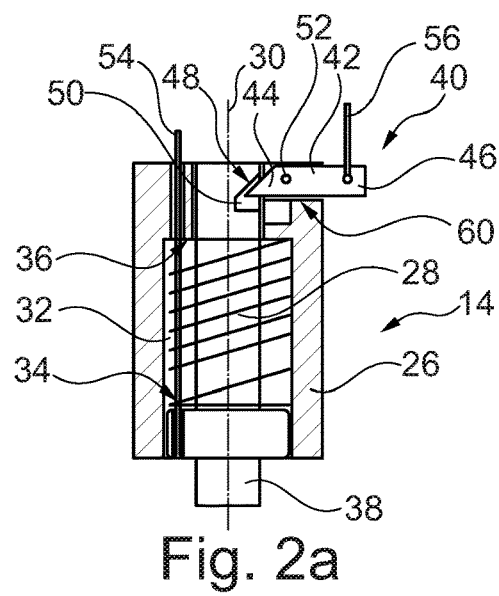
FIGS. 2a and 2b show two detail views of an arresting device.
Figure 2B:
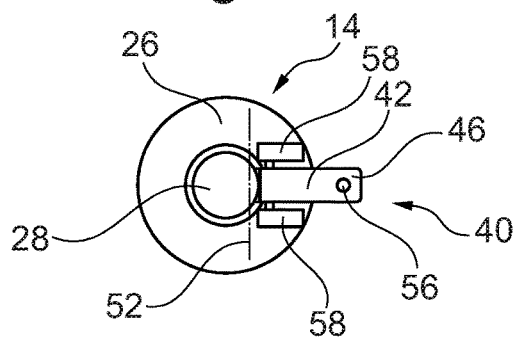

FIGS. 2a and 2b show an arresting device 14 in views from two sides. An arresting body 28 is mounted, so as to be movable along a vertical axis 30, in a section 26 of bushing-like design. In the interior of the bushing-like section 26 there is situated a spring device in the form of a pressure spring 32, which is positioned between a bearing surface 34 of the arresting body 28 and an inner surface 36 of the section 26. By means of a preload, the pressure spring 32 presses permanently against the arresting body 28 and, here, is supported on the inner surface 36. The arresting body 28 is consequently permanently pushed into an arresting position directed downwardly in the plane of the drawing, in which arresting position a stud 38 has been displaced out of the arresting device 14 into an outermost position.

Also arranged on the arresting device 14 is a locking unit 40 which has a tiltably mounted lever 42. Said lever is arranged at the edge of the arresting body 38 and has a first end 44 and a second end 46. The first end 44 is bevelled, such that a ramp surface 48 is realized which is averted from the stud 38 and which is directed to the top side 22 of the frame. The arresting device 14 is shown in FIG. 2a in the arresting position. Here, the first end 44 projects into a depression 50 of the arresting body 28, which depression is shaped correspondingly to the first end 44. The process of the locking and release will be discussed in detail on the basis of the further following drawings.

The lever 42 is mounted so as to be tiltable about a tilting axis 52. As will likewise be demonstrated in the further following drawings, the lever 42 can, from a horizontal as illustrated in FIG. 2a, be tilted only such that the first end 44 is moved downwards in the plane of the drawing and the second end 46 is moved upwards in the plane of the drawing. The lever 42 is consequently limited in terms of its tilting movement. When the first end 44 is in engagement, the arresting body 28 cannot be moved further in the direction of the top side 22 of the seat frame 8, and is arrested. In FIG. 2a, a tilting limiting means is realized in the form of a stop surface 60, which comes into areal contact with the lever 42. As a result of the areal contact, no further clockwise rotation is possible, but an anticlockwise rotation is possible.

Furthermore, the arresting body 28 is connected via a first traction mechanism 54 to the operating unit 24. The second end 46 of the lever 42 is connected via a second traction mechanism 56, as movement means, to the operating unit 24. The two traction mechanisms 54 and 56 are realized in the form of Bowden cables. The exact type of operating unit and the attachment are not of significance for the functioning of the arresting device 14, as long as the first traction mechanism 54 and the second traction mechanism 56 can independently of one another apply a pulling force to the components shown.

In FIG. 2b, by way of example, an arrangement of two flanges 58 is shown, which are arranged on the bushing-like section 26 and which together provide the tilting axis 52.

FIGS. 3a-3g show, in multiple partial illustrations, the process of the arresting and release of the arresting device 14. In a partial illustration 3a, the arresting device 14 is shown in an arresting position in the absence of action of the operating unit 24. No pulling force is introduced into the arresting device 14 via the traction mechanisms 54 and 56. The stud 38 of the arresting body 28 is in an end position in which the stud can project no further out of the arresting device 14. The first end 44 of the lever 42 is, by way of the ramp surface 48, in areal contact with a surface, averted from the stud 38, of the depression 50. The stud 38 is held in its present position by the pressure of the spring 32.

In partial illustration 3b, a pulling force is applied to the first traction mechanism 54, which is symbolized by a force arrow. By contrast, the second traction mechanism 56 remains unloaded. By means of the areal contact with the stop surface 60 as tilting limiting means, the first end 44 of the lever 42 is duly loaded with an upwardly acting force by the arresting body 28, but does not permit the movement of the arresting body 28. The arresting body 28 is consequently locked. A lower edge of the depression 50 is in this case in areal contact with the first end 44 of the lever 42.

In the partial illustration 3c, a position relieved of load, as assumed in partial illustration 3a, is restored in order to subsequently release a locking of the arresting body 28.

Partial illustration 3d shows the introduction of a pulling force into the second traction mechanism 56 proceeding from the position shown in partial illustration 3c. Owing to the spacing between the lower edge of the depression 50 and the first end 44 of the lever 42, a rotation of the lever 42 counterclockwise is possible after introduction of the pulling force. The first end 44 thus passes out of engagement with the depression 50. The locking of the arresting body 28 is consequently released.

Subsequently, as shown in partial illustration 3e, a pulling force can be introduced into the first traction mechanism 54, with the pulling force on the second traction mechanism 56 being maintained. The arresting body 28 can consequently be released from the arresting position. Partial illustrations 3f and 3g show the progress of the release of the arresting body 28. In partial illustration 3g, the arresting body 28 is in its release position, in which the stud 38 has been fully retracted into the arresting device 14, and the seat frame 8 is consequently no longer arrested on the carrier structure 12.

Figures 4A, 4B, 4C:
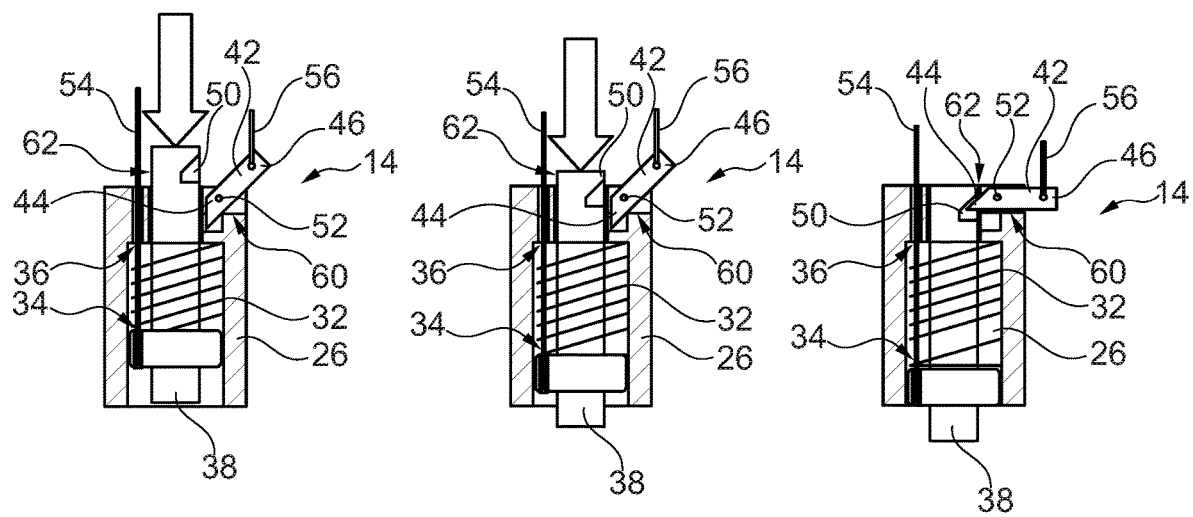
FIGS. 4a-4c show the process of the manual arresting of the arresting device.

FIGS. 4a-4c furthermore demonstrate the manual actuation of the arresting device 14, likewise in three partial illustrations, respectively. It is shown here that, when the arresting device 14 is in a release position, an actuation end 62 projects out of said arresting device. The release position can consequently be very clearly identified by a user. It is conceivable for the actuation end 62 to be provided with a conspicuous colour marking. As a result of the projecting-out position, the actuation end 62 can, by introduction of a pressure force, as symbolized by a force arrow, be pushed into the arresting device 14. By means of the lever 42, automatic locking occurs as soon as the first end 44 moves into the depression 50 of the arresting body 28. The arresting device 14 can consequently be manually actuated in the presence of a defective spring 32. The arresting body 28 is nevertheless reliably locked in an arresting position, and the security of the arresting device 14 is not dependent on the function of a pressure spring.

Figure 5:
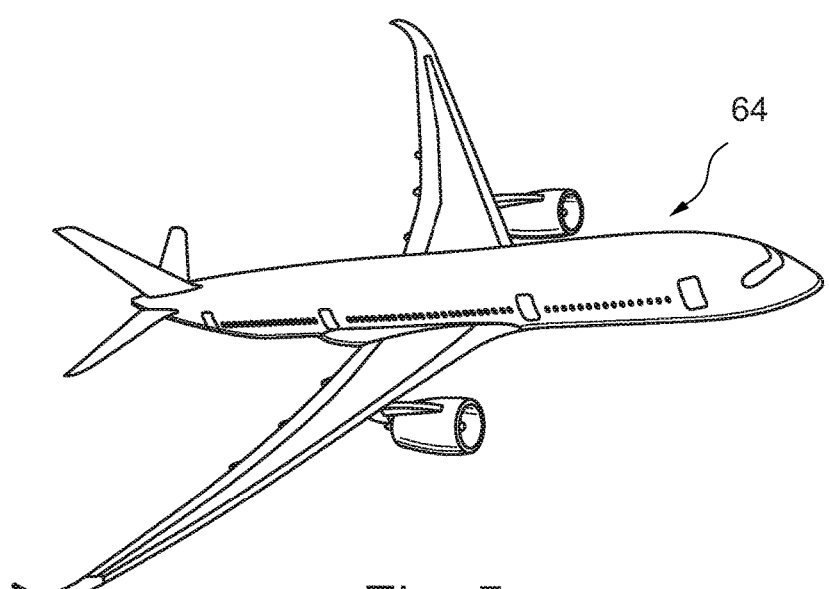
FIG. 5 shows an aircraft with a passenger seat system installed therein.

Finally, FIG. 5 shows an aircraft 64 with a cabin formed therein, which cabin has at least one passenger seat system with the features mentioned above installed therein.

It is additionally pointed out that "having" does not rule out other elements or steps, and "a" or "an" do not rule out a multiplicity. It is also pointed out that features that have been described with reference to one of the above exemplary embodiments may also be used in combination with other features of other exemplary embodiments described above. Reference designations in the claims are not to be regarded as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger seat system, for a means of transport, comprising:
    at least one elongate carrier structure, configured to be attached, fixedly with respect to a structure, in the interior of the means of transport, and a plurality of mutually spaced-apart raster openings on a top side of the carrier structure, and
    at least one seat having a seat frame, the seat frame being displaceable and arrestable on the carrier structure and having a bottom side, lying on the carrier structure, and a top side holding a seat surface,
    wherein the seat frame has an arresting device on the bottom side and has an operating unit coupled to the arresting device, at a position averted from the bottom side,
    wherein the operating unit is movable at least into an arresting position and an unlocking position,
    wherein the arresting device has an arresting body mounted so as to be movable perpendicularly with respect to the carrier structure and pushed by a spring device, by a spring force, into an arresting position, and in a release position situated opposite the arresting position, projects with an actuation end out of the arresting device,
    wherein the arresting device further comprises a locking unit which is configured to automatically hold the arresting body in the arresting position as soon as the arresting body reaches the arresting position,
    wherein the locking unit has a tiltably mounted lever with a first end and with a second end,
    wherein the first end is configured to engage into a depression on a shell surface of the arresting body, and
    wherein the second end is configured to be coupled to the operating unit.

2. The passenger seat system according to claim 1, wherein the operating unit is connected to a first traction mechanism coupled to the arresting body and is configured to apply a pulling force, acting oppositely to the spring force, to the arresting body.

3. The passenger seat system according to claim 1, wherein the operating unit is connected to at least one movement means coupled to the locking unit and is configured to selectively release the locking unit.

4. The passenger seat system according to claim 1,
wherein the arresting device has a tilting limiting means configured to allow the first end of the lever, in an arresting position of the arresting body, when the first end is engaging into the depression, to tilt only in a direction away from the top side of the seat frame.

5. The passenger seat system according to claim 1,
wherein the first end of the lever is, on one side, bevelled in ramp-shaped fashion to form a ramp surface, wherein the ramp surface faces towards the top side of the seat frame, and
wherein the depression is formed in the arresting body correspondingly with respect to the first end.

6. The passenger seat system according to claim 3,
wherein the at least one movement means is configured as a second traction mechanism extending from the operating unit to the second end of the lever.

7. The means of transport, having a cabin and having at least one passenger seat system according to claim 1 formed therein.

8. The means of transport according to claim 7, wherein the means of transport is an aircraft.

9. The means of transport according to claim 7, further comprising a plurality of service units above passenger seats, wherein the number of service units corresponds at least to a predetermined number of passenger seats situated therebelow.

* * * * *